US012153726B1

(12) United States Patent
Healey et al.

(10) Patent No.: US 12,153,726 B1
(45) Date of Patent: Nov. 26, 2024

(54) INTEGRATING TEXT OF A DOCUMENT INTO AN EXTENDED REALITY ENVIRONMENT

(71) Applicant: Adobe Inc., San Jose, CA (US)

(72) Inventors: Jennifer Anne Healey, San Jose, CA (US); Geonsun Lee, College Park, MD (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/217,094

(22) Filed: Jun. 30, 2023

(51) Int. Cl.
*G06F 3/01* (2006.01)
*G06F 3/04815* (2022.01)
*G06T 13/00* (2011.01)
*G06F 40/166* (2020.01)
*G06F 111/18* (2020.01)
*G06T 11/60* (2006.01)

(52) U.S. Cl.
CPC .......... *G06F 3/011* (2013.01); *G06F 3/04815* (2013.01); *G06T 13/00* (2013.01); *G06F 40/166* (2020.01); *G06F 2111/18* (2020.01); *G06T 11/60* (2013.01); *G06T 2200/24* (2013.01)

(58) Field of Classification Search
CPC .... G06F 3/011; G06F 3/04815; G06F 40/166; G06F 2111/18; G06T 13/00; G06T 11/60; G06T 2200/24
See application file for complete search history.

(56) References Cited

U.S. PATENT DOCUMENTS

| | | | | |
|---|---|---|---|---|
| 7,055,094 | B2* | 5/2006 | Imielinski | G06F 40/143 |
| | | | | 715/239 |
| 9,384,594 | B2* | 7/2016 | Maciocci | G06T 17/05 |
| 10,068,380 | B2* | 9/2018 | Chang | G06F 40/10 |
| 10,203,762 | B2* | 2/2019 | Bradski | H04N 21/414 |
| 10,268,661 | B2* | 4/2019 | Tashman | G06F 3/0485 |
| 11,263,818 | B2* | 3/2022 | Shreve | G06T 19/006 |
| 11,704,473 | B2* | 7/2023 | Tashman | G06F 3/0485 |
| | | | | 715/252 |
| 11,966,701 | B2* | 4/2024 | Pu | G06F 3/011 |

(Continued)

OTHER PUBLICATIONS

"Sticky Notes AR", Google Play [retrieved Mar. 9, 2023]. Retrieved from the Internet <https://play.google.com/store/apps/details?id=com.cunum.stickynotesar&hl=en_US&gl=US>., 3 Pages.

(Continued)

*Primary Examiner* — Michael J Jansen, II
(74) *Attorney, Agent, or Firm* — FIG. 1 Patents

(57) ABSTRACT

In accordance with the described techniques, a document integration system receives a document that includes text. The document integration system generates a plurality of virtual objects based on the document, such that each virtual object includes a different portion of the text. Further, the plurality of virtual objects are inserted into an extended reality environment. User input is received affixing a particular virtual object to a user representation in the extended reality environment and specifying movement of the particular virtual object as following the user representation from a first location to a second location in the extended reality environment. The particular virtual object is displayed as located and fastened to the second location in the extended reality environment.

20 Claims, 10 Drawing Sheets

(56) References Cited

U.S. PATENT DOCUMENTS

| | | | | |
|---|---|---|---|---|
| 2002/0013792 | A1* | 1/2002 | Imielinski | G06F 40/117 |
| | | | | 715/239 |
| 2012/0249741 | A1* | 10/2012 | Maciocci | G06T 19/006 |
| | | | | 348/51 |
| 2013/0191711 | A1* | 7/2013 | Tashman | G06F 3/0485 |
| | | | | 715/252 |
| 2016/0026253 | A1* | 1/2016 | Bradski | H04N 13/128 |
| | | | | 345/8 |
| 2017/0358125 | A1* | 12/2017 | Neumann | G06T 19/003 |
| 2018/0137681 | A1* | 5/2018 | Chang | G06F 40/10 |
| 2019/0251140 | A1* | 8/2019 | Tashman | G06F 3/04883 |
| 2021/0264669 | A1* | 8/2021 | Shreve | G06T 7/70 |
| 2022/0139041 | A1* | 5/2022 | Li | G06F 16/9558 |
| | | | | 345/419 |
| 2022/0374130 | A1* | 11/2022 | Pu | G06F 3/04815 |

OTHER PUBLICATIONS

Arawjo, Ian, et al., "TypeTalker: A Speech Synthesis-Based Multi-Modal Commenting System", ACM Conference on Computer Supported Cooperative Work and Social Computing [retrieved Mar. 9, 2023]. Retrieved from the Internet <https://dwyoon.com/files/papers/cscw2017-typetalker.pdf>., Feb. 25, 2017, 12 Pages.

Drey, Tobias, et al., "Towards Collaborative Learning in Virtual Reality: A Comparison of Co-Located Symmetric and Asymmetric Pair-Learning", CHI Conference on Human Factors in Computing Systems [retrieved Mar. 9, 2023]. Retrieved from the Internet <https://www.uni-ulm.de/fileadmin/website_uni_ulm/iui.inst.100/1-hci/hci-paper/2022/CHI2022_Collaborative_Learning_in_VR_Drey.pdf>., Apr. 29, 2022, 19 Pages.

Kumaravel, Balasaravanan Thoravi, et al., "Loki: Facilitating Remote Instruction of Physical Tasks Using Bi-Directional Mixed-Reality Telepresence", UIST '19: Proceedings of the 32nd Annual ACM Symposium on User Interface Software and Technology [retrieved Mar. 9, 2023]. Retrieved from the Internet <https://people.eecs.berkeley.edu/~bjoern/papers/kumaravel-loki-uist2019.pdf>., Oct. 2019, 14 pages.

Placenote SDK, "Add virtual sticky notes to the world with Placenote", YouTube, Uploaded by Placenote SDK [retrieved Mar. 9, 2023]. Retrieved from the Internet <https://www.youtube.com/watch?v=qzJZPpha6RA>., Oct. 18, 2018, 3 Pages.

Plutomen, "Plutomen Vnotes : AR based Virtual Sticky Notes", Youtube, uploaded by Plutomen [retrieved Mar. 9, 2023]. Retrieved from the Internet <https://www.youtube.com/watch?v=nMHy_VNGA8I>., Dec. 20, 2019, 2 Pages.

Radu, Iulian, et al., "Unequal Impacts of Augmented Reality on Learning and Collaboration During Robot Programming with Peers", Proceedings of the ACM on Human-Computer Interaction [retrieved Mar. 9, 2023]. Retrieved from the Internet <https://par.nsf.gov/servlets/purl/10276293>., Jan. 5, 2021, 23 Pages.

Shunzhe Ma, "AirSticky—AR Sticky Notes", Apple Store [retrieved Mar. 9, 2023]. Retrieved from the Internet <https://apps.apple.com/us/app/airsticky-ar-sticky-notes/id1486880906>., 3 Pages.

Sivaraman, Venkatesh, et al., "Simplified Audio Production in Asynchronous Voice-Based Discussions", CHI '16: Proceedings of the 2016 CHI Conference on Human Factors in Computing Systems [retrieved Mar. 9, 2023]. Retrieved from the Internet <, May 7, 2016, 10 Pages.

VGIS Inc., "Augmented reality 'sticky notes'—vGIS Tags", YouTube, Uploaded by vGIS Inc.[retrieved Mar. 9, 2023]. Retrieved from the Internet <https://www.youtube.com/watch?v=6Ygmju_jpiw>., Mar. 18, 2020, 2 Pages.

* cited by examiner

900 

902
Receive a document that includes text

904
Generate a plurality of virtual objects based on the document, the plurality of virtual objects including, respectively, a different portion of the text

906
Insert the plurality of virtual objects into an extended reality environment.

908
Receive an anchor input affixing a particular said virtual object to an object or location in the extended reality environment

910
Receive an ownership input claiming ownership of the particular said virtual object by a user

912
Receive a status input assigning a status to a task associated with the particular said virtual object

914
Display the particular said virtual object as affixed to the object or location in the extended reality environment, having an ownership indication corresponding to the user, and having a status indication corresponding to the status.

Fig. 9

INTEGRATING TEXT OF A DOCUMENT INTO AN EXTENDED REALITY ENVIRONMENT

BACKGROUND

Extended reality environments (e.g., virtual reality environments, augmented reality environments, and mixed reality environments) are particularly well-suited for training users to perform dangerous, expensive, and/or resource-constrained objectives. In an example, one or more extended reality users are trained for the objective of performing a chemistry experiment within an extended reality environment to eliminate consumption of expensive resources that would otherwise be consumed in a real-world training scenario.

SUMMARY

Extended reality environments that support text integration are described. In an example, a document integration system receives a document that includes text. The document integration system partitions the document into a plurality of text segments, e.g., based on text-based heuristics indicating that the plurality of text segments correspond to different components of a list in the text. Further, the document integration system generates a plurality of virtual objects from the plurality of text segments, respectively, and inserts the plurality of virtual objects into the extended reality environment.

Anchors are assignable to the virtual objects, which affix or fasten the virtual objects to locations, objects, or user representations (e.g., user avatars that mimic the appearance of users) in the extended reality environment. A virtual object that is affixed to a user representation, for example, is displayable as following the user representation as the user representation is navigated to different locations in the extended reality environment. A virtual object that is affixed to a location in the extended reality environment, for example, remains located and fastened to the location regardless of the user representation's movement.

The virtual objects are displayable as including visual designations that convey various types of information associated with the virtual objects. In one example, a virtual object is claimed as owned by a user in the extended reality environment, and in response, the virtual object is displayed as visually differentiated from a different virtual object that is claimed as owned by a different user in the extended reality environment. In another example, one of multiple statuses is assigned to a virtual object, and in response, the virtual object is displayed as including a status element and a motion characteristic corresponding to the status. Notably, virtual objects assigned different statuses are displayed as including different status elements and different motion characteristics.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 9 is a flow diagram depicting a procedure in an example implementation for integrating text of a document into an extended reality environment.

DETAILED DESCRIPTION

Overview

Figure 1:
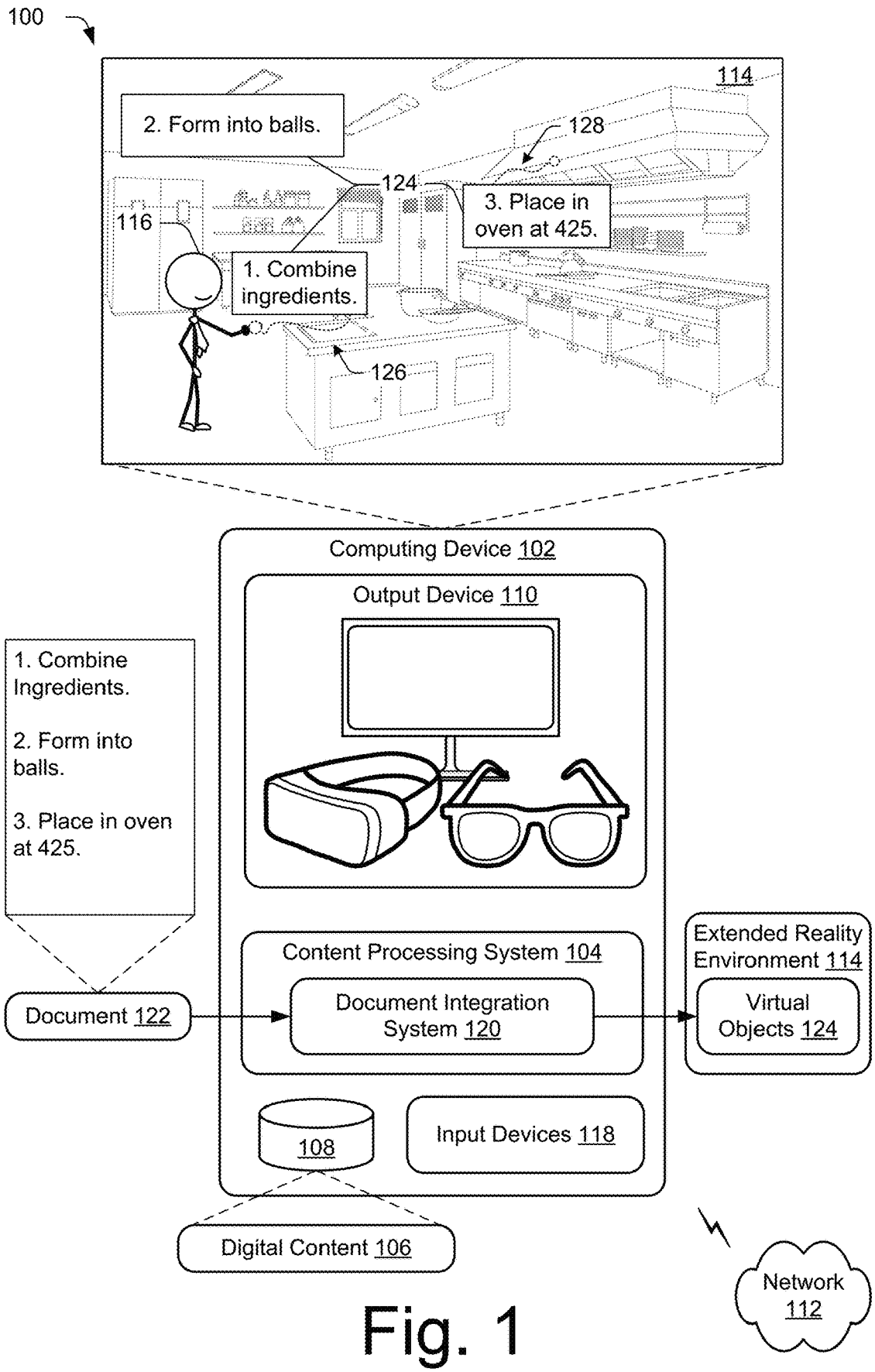
FIG. 1 is an illustration of an environment in an example implementation that is operable to employ techniques described herein for integrating text of a document into an extended reality environment.

Extended reality environments are particularly well-suited for training users to perform dangerous, expensive, and/or resource-constrained objectives. Typically, an objective is embodied in a document that includes a series of tasks that are to be performed by one or more users in the extended reality environment. Conventional techniques for task completion in an extended reality environment typically rely on user input within the extended reality space to generate task objects that are viewable within the extended reality environment. Oftentimes, this involves generating a task object in the extended reality environment and manually composing text for the task object as copied from steps and/or instructions of an existing document. This is a time consuming and tedious process, particularly when a long set of instructions is being reproduced in the extended reality environment. Moreover, task objects generated in accordance with conventional techniques often lack display mechanisms for conveying information related to performing tasks of the task objects, thereby inhibiting task performance efficiency in the extended reality environment.

Accordingly, techniques are described for integrating text of a document into an extended reality environment. A computing device, for instance, includes a content processing system configured to display an extended reality environment (e.g., a virtual reality environment, an augmented reality environment, or a mixed reality environment) via an output device, e.g., a virtual reality headset, augmented reality glasses, etc. The extended reality environment includes one or more user representations, each of which correspond to a different user of the content processing system. In implementations in which the extended reality environment is a virtual reality environment, the user representations are user avatars that mimic the appearance of respective users of the content processing system. In implementations in which the extended reality environment is an augmented reality environment, the user representations are respective users of the content processing system.

To overcome the limitations of conventional techniques, the content processing system employs a document integration system. Broadly, the document integration system is configured to integrate text of a document into virtual objects that are inserted into the extended reality environment. Further, the virtual objects are independently manipulable by the user representations to move the virtual objects, and cause the virtual objects to display visual indications that convey specific types of information.

In the following example, the document integration system receives a document that includes text. In one or more examples, the document is an enumerated list of tasks, e.g., the text includes a first list element "(1)" followed by a first task, a second list element "(2)" followed by a second task, and so on. In accordance with the described techniques, the document integration system partitions the document into text segments based on text-based heuristics indicating that the text segments correspond to different components of a list in the text. The heuristics, for instance, include various text-based indicators that typically separate different components of the list. In the described example, for instance, the document integration system determines that the series of characters including a number surrounded by parentheses (e.g., (1), (2), (3), etc.) separate different components of the list. The document integration system further identifies, as the text segments, portions of text between successive text-based indicators. By way of example, the document integration system identifies, as a particular text segment, the portion of text that is in between "(1)" and "(2)" in the document. Other examples are also contemplated, such as through processing of the text using natural language understanding as implemented by a machine-learning model.

Moreover, the document integration system generates a virtual object for each respective text segment and populates the virtual object with text from the respective text segment. Continuing with the previous example, a first virtual object includes the text situated between "(1)" and "(2)" in the document (e.g., the text of the first task), a second virtual object includes the text situated between "(2)" and "(3)" in the document (e.g., the text of the second task), and so forth. Generative artificial intelligence techniques as implemented using a machine-learning model are also employable as part of generating the virtual objects, e.g., based on the text segments to generate the virtual objects as representative of "what" is expressed by the text segments.

As part of generating the virtual objects, the document integration system orders the virtual objects in a sequence based on an order in which the corresponding text segments appear in the document. Further, the document integration system inserts the virtual objects into the extended reality environment, e.g., as a vertical stack, in which each subsequent virtual object in the sequence is stacked beneath a preceding virtual object in the sequence.

Once inserted, anchors are assignable to the virtual objects, which affix or fasten the virtual objects to user representations, objects, or locations in the extended reality environment. By way of example, a user provides a grab input with respect to a particular virtual object while the user's user representation is within a threshold distance of the particular virtual object. In response, the document integration system assigns an anchor to the particular virtual object affixing the particular virtual object to the user representation.

While the particular virtual object is affixed to the user representation, the document integration system receives input specifying movement of the user representation from a first location to a second location in the extended reality environment. The document integration system is configured to display the particular virtual object as following the user representation from the first location to the second location. From the viewpoint of the user representation to which the particular virtual object is affixed, the particular virtual object remains within a field of view of the user regardless of the user representation's movement. From the viewpoint of a different user observing the user representation, the particular virtual object remains within a particular distance of the user representation as the user representation moves throughout the extended reality environment.

While the particular virtual object is affixed to the user representation and the user representation is positioned at the second location, the user provides a place input with respect to the second location (or object at the second location). In response, the document integration system breaks the anchor affixing the particular virtual object to the user representation. In addition, the document integration system assigns a new anchor to the particular virtual object fastening the particular virtual object to the second location (or object at the second location). While anchored to the second location, the virtual object remains located and fastened to the second location regardless of the user representation's movement. Accordingly, the virtual objects dynamically transition from being affixed to a user representation to being affixed to the extended reality environment based on user input. Other examples are also contemplated, such as through use of a classifier as implemented using a machine-learning model to identify anchors corresponding to the virtual objects.

Moreover, the document integration system displays respective virtual objects having distinct visual indications based on which one of multiple users claim ownership of the respective virtual objects. By way of example, the user provides an ownership input with respect to the particular virtual object located and fastened to the second location. In response to the ownership input, the document integration system assigns ownership of the particular virtual object to the user, and displays the particular virtual object having an ownership indication corresponding to the user. As part of this, the document integration system displays the particular virtual object as visually differentiated from a different virtual object that is claimed as owned by a different user. By way of example, the document integration system displays a border surrounding the particular virtual object having a particular distinctive color corresponding to the user. Further, the document integration system displays a border surrounding the different virtual object having a different distinctive color corresponding to the different user.

In addition, the document integration system displays respective virtual objects having distinct visual designations based on which one of multiple statuses are assigned to the respective virtual objects. In various examples, the statuses assignable to the virtual objects include, but are not limited to, "task not yet attempted," "task successfully completed," and "task unsuccessfully attempted." Each status is associated with a distinct status element that is displayable within a virtual object to indicate the status. Further, each of the statuses are associated with a distinct motion characteristic, such that a virtual object is displayable in accordance with the motion characteristic to indicate the status.

By way of example, the status "task not yet attempted" is associated with a status element of a circle filled with a uniform color, and a motion characteristic dictating that virtual elements assigned the status remain stationary. Further, the status "task successfully completed" is associated with a status element of a check mark icon, and a motion characteristic dictating that virtual elements assigned the status repeatedly move up and down. In addition, the status "task unsuccessfully attempted" is associated with a status element of an "X" icon, and a motion characteristic dictating that virtual elements assigned the status repeatedly move side to side.

Continuing with the previous example, the user provides a status input with respect to the particular virtual object located and fastened to the second location. In particular, the status input assigns the status input "task unsuccessfully attempted" to the particular virtual object. In response, the document integration system displays the particular virtual including the "X" icon, and as moving repeatedly side to side to indicate the assigned status. Accordingly, from the viewpoint of a different user observing the user representation, the particular virtual object is displayed as fastened to the second location, as including the ownership indication specifying that the particular virtual object is owned by the user, and as including the status indication specifying that the task of the virtual object has been unsuccessfully attempted.

In contrast to conventional techniques, the described techniques automatically transform a document into virtual objects that include respective text segments of the document, and insert the virtual objects into the extended reality environment. That is, the document integration system generates and inserts the virtual objects into the extended reality environment without user input apart from providing the document to be integrated. In other words, the described techniques eliminate manual composition of the text within the extended reality space. Accordingly, the virtual objects are generatable in a reduced amount of time and with fewer user interactions, as compared to conventional techniques, thereby improving user experience for task completion in the extended reality environment.

In addition, the various virtual objects are independently movable and affixable to different locations and/or user representations in the extended reality environment. This improves task performance efficiency in the extended reality environment over conventional techniques. This improvement is achieved, in part, because a virtual object is affixable to a location which does not occlude a user's field of view for performing a corresponding task, but is viewable while the user performs the task by simply glancing at the location. Since the task is embodied in a virtual object that is separate from other virtual objects, the task is identifiable without the user locating the task within a long list of tasks each time the user references the task. Further, by allowing the virtual objects to be affixed to a user representation, a user is able to complete tasks that are performed at multiple locations or while the user representation is in motion with increased efficiency. This is because a virtual object anchored to a user representation remain within a corresponding user's field of view.

The status indications and the ownership indications further improve task performance efficiency in the extended reality environment. For example, conventional techniques typically rely on verbal communication to convey information regarding which tasks have been completed, which tasks are currently being performed by which users, and which tasks the users need assistance completing. In the described techniques, however, this information is determinable by a user by simply scanning the extended reality environment. Indeed, the status indications indicate whether a task has been successfully completed, has not yet been attempted, or is unable to be completed by a user. Further, the ownership indications indicate which tasks are currently being performed by which users. Accordingly, the described techniques improve task performance efficiency in collaborative extended reality environments by reducing reliance on verbal communication to convey information associated with the tasks.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques described herein for integrating text of a document into an extended reality environment. The illustrated environment 100 includes a computing device 102, which is configurable in a variety of ways. The computing device 102, for instance, is configurable as a desktop computer, a laptop computer, a mobile device (e.g., assuming a handheld configuration such as a tablet or mobile phone as illustrated), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 10.

The computing device 102 is illustrated as including a content processing system 104. The content processing system 104 is implemented at least partially in hardware of the computing device 102 to process and transform digital content 106, which is illustrated as maintained in storage 108 of the computing device 102. Such processing includes creation of the digital content 106, modification of the digital content 106, and rendering of the digital content 106 for output by an output device 110. Examples of the output device 110 include, but are not limited to, a virtual reality headset, augmented reality glasses, and a monitor or device screen, as depicted. Although illustrated as implemented locally at the computing device 102, functionality of the content processing system 104 is also configurable as whole or part via functionality available via the network 112, such as part of a web service or "in the cloud."

In accordance with the described techniques, the processing of the digital content 106 includes rendering the digital content 106, as part of an extended reality environment 114, e.g., a virtual reality environment, an augmented reality environment, or a mixed reality environment. In one or more implementations, the extended reality environment 114 includes a user representation 116 of a user of the output device 110. In one example in which the extended reality environment 114 is a virtual reality environment, the user representation 116 is an avatar that mimics the appearance of the user. In another example in which the extended reality environment 114 is an augmented reality environment, the user representation 116 is the user.

The computing device 102 is further illustrated as including input devices 118, which enable user input controlling movement of the user representation 116, and controlling interaction of the user representation 114 with objects in the extended reality environment 114. In virtual reality scenarios, the input devices 118 include, but are not limited to, handheld virtual reality headset controllers, keyboards, and/or curser control devices, e.g., mouses. In augmented reality scenarios, the input devices 118 include various sensors to detect positioning and motion of the user, as well as gestures performed by the user. Examples of such sensors include but are not limited to light detection and ranging (LIDAR) sensors, depth sensors, and/or motion sensors.

An example of functionality incorporated by the content processing system 104 to process the digital content 106 is illustrated as a document integration system 120. The document integration system 120 is configured to receive a document 122 that includes text, and generate a plurality of virtual objects 124 each including a different portion of the text for insertion into the extended reality environment 114. By way of example, the illustrated document 122 includes text separated into a plurality of enumerated tasks. As shown, the document integration system 120 generates a virtual object 124 for each task of the document 122 that includes the text of the corresponding task. Further, the document integration system 120 inserts the plurality of virtual objects 124 into the extended reality environment 114. Once inserted, the virtual objects 124 are affixable to different locations and/or objects in the extended reality environment 114. Indeed, as shown at 126, a respective virtual object 124 is affixed to the user representation 116. Further, as shown at 128, a respective virtual object 124 is affixed to an object in the extended reality environment 114.

Accordingly, the document integration system 120 automatically transforms the document 122 into virtual objects 124 that include respective text segments of the document 122, and inserts the virtual objects 124 into the extended reality environment 114. This contrasts with conventional techniques which rely on user input within the extended reality space to populate task objects with text, as copied from an existing document. Given this, the virtual objects 124 are generatable in a reduced amount of time and with fewer user interactions, as compared to conventional techniques, thereby improving user experience for task completion in the extended reality environment 114.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Integrating Text of a Document into an Extended Reality Environment

Figure 2:
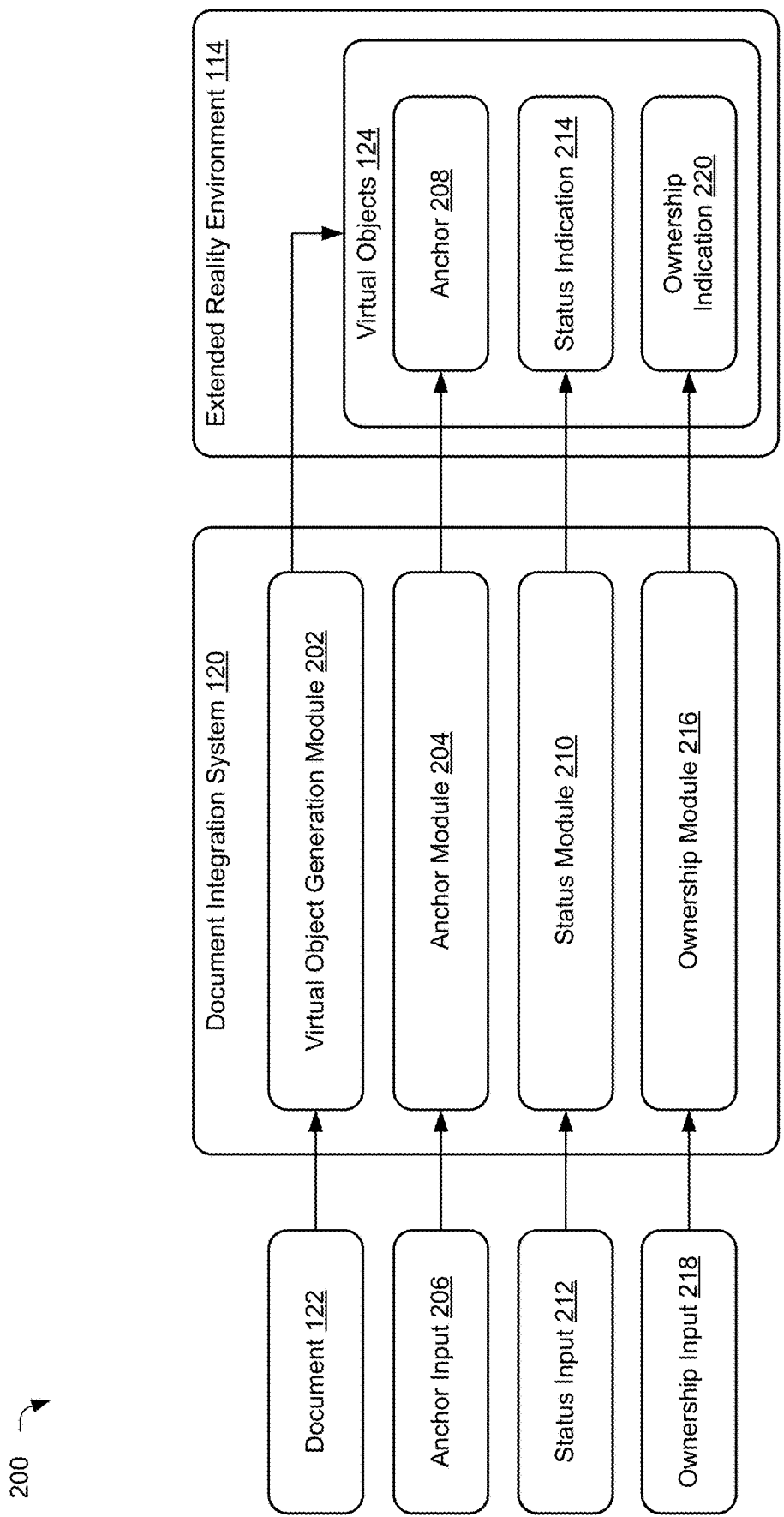
FIG. 2 depicts a system in an example implementation showing operation of a document integration system.

FIG. 2 depicts a system 200 in an example implementation showing operation of a document integration system 120. As shown, the document integration system 120 includes a virtual object generation module 202, which receives a document 122 that includes text. Broadly, the virtual object generation module 202 is configured to generate a plurality of virtual objects 124 that include different portions of the text, respectively. Further, the virtual object generation module 202 inserts the generated virtual objects 124 into the extended reality environment 114.

The document integration system 120 also includes an anchor module 204, which is configured to receive anchor inputs 206 (e.g., via the input devices 118) assigning anchors 208 to respective virtual objects 124. Broadly, an anchor 208 affixes a respective virtual object 124 to a user representation 116, or an object or location within the extended reality environment 114. While anchored to a user representation 116, a respective virtual object 124 is displayed as following the user representation 116 moving throughout the extended reality environment 114. While anchored to the object or location in the extended reality environment 114, a respective virtual object 124 remains fastened to the object or location, regardless of the movement of the user representation 116.

A status module 210 is further employed by the document integration system 120. The status module 210 is configured to receive status inputs 212 (e.g., via the input devices 118) assigning statuses to respective virtual objects 124. In response to a status input 212 assigning a status to a particular virtual object 124, the status module 210 displays the particular virtual object 124 having a status indication 214 that differs visually depending on which one of the multiple statuses is assigned to the particular virtual object 124. For example, a first virtual object 124 assigned a first status includes a different status indication than a second virtual object 124 assigned a second status.

The document integration system 120 further includes an ownership module 216, which is configured to receive ownership inputs 218 (e.g., via the input devices 118) as provided by respective users of the document integration system 120. An ownership input 218 is effective to claim ownership of a respective virtual object 124 by the user that provides the ownership input 218. In response to the ownership inputs 218, the ownership module 216 displays the respective virtual objects 124 having ownership indications 220 that differ visually based on which users claim the respective virtual objects 124. By way of example, a first virtual object 124 claimed as owned by a first user includes a different ownership indication 220 than a second virtual object 124 claimed as owned by a second user.

Figure 3:
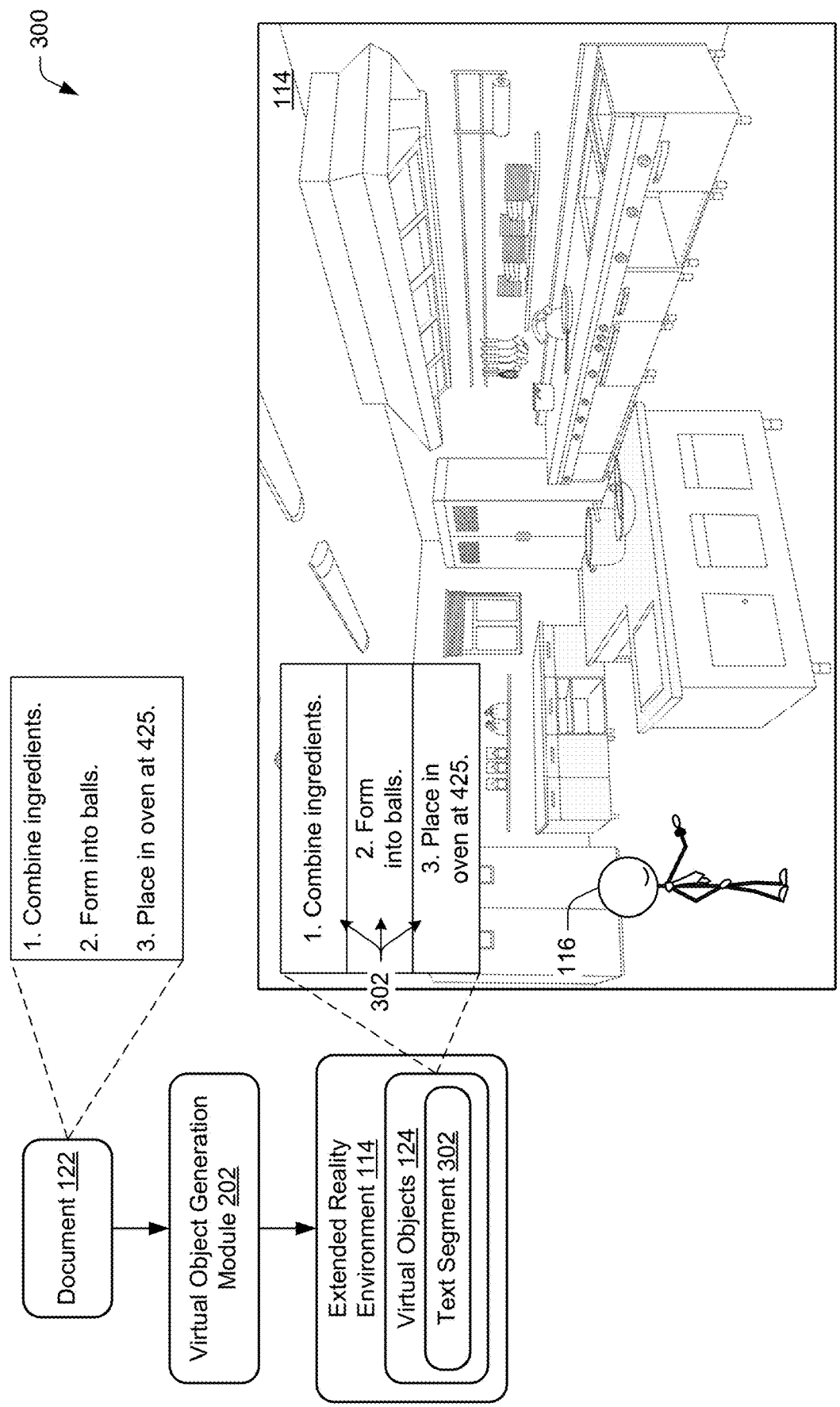
FIG. 3 depicts a system in an example implementation showing operation of a virtual object generation module.

FIG. 3 depicts a system 300 in an example implementation showing operation of a virtual object generation module 202. As shown, the virtual object generation module 202 receives a document 122 that includes text. In one or more implementations, the document 122 is a digital document that is uploaded from the storage 108 of the computing device 102. Additionally or alternatively, the document 122 is a physical document that is scanned using a camera of the computing device 102 and converted to a digital document before being provided to the virtual object generation module 202. In the illustrated example, the document 122 includes an enumerated list of tasks. However, it is to be appreciated that the document 122 includes text having different organizational structures in variations, e.g., text in a bulleted list, text in paragraph format, text in an outline format, sentences separated by a spacing buffer, and so on.

In accordance with the described techniques, the virtual object generation module 202 is configured to partition the document 122 into text segments 302 including different portions of the text, respectively. In one or more implementations, the virtual object generation module 202 partitions the document into text segments 302 based on one or more text-based heuristics indicating that the text segments 302 correspond to different components of a list in the text. One or more of the heuristics correspond to a text-based indicator which separates the different components of the list. In the illustrated example, for instance, the text-based indicator is a number followed by a period. Other text-based indicators are also contemplated, including but not limited to, numbers surrounded by other types of punctuation (e.g., parentheses), bullets, dashes, periods separating different sentences of a paragraph, spacing buffers between portions of text, and so on.

The virtual object generation module 202 further identifies, as a particular text segment 302, the text of the document 122 between successive text-based indicators. In the illustrated example, the virtual object generation module 202 identifies "1." and "2." as successive text-based indicators. Further, the virtual object generation module 202 identifies, as one of the text segments 302, the text "combine ingredients" between the text-based indicators "1." and "2."

Additionally or alternatively, the virtual object generation module 202 identifies the text segments 302 based on one or more contiguous portions of text in the document 122 having a particular marking. For example, a first contiguous portion of the text in the document is highlighted and a second contiguous portion of the text in the document is highlighted. In this example, the virtual object generation module 202 identifies, as a first text segment 302, the first contiguous portion of text. Further, the virtual object generation module 202 identifies, as a second text segment 302, the second contiguous portion of text. In variations, the markings indicating different text segments 302 include underlined text, boldened text, italicized text, differently-colored portions of text, and so on.

In one or more implementations, the markings override the text-based heuristics. Consider an example in which the text of the depicted document 122 "1. Combine ingredients. 2. Form into balls." is contiguously highlighted. In this example, the virtual object generation module 202 combines the text of step one and the text of step two into a single text segment 302. In another example, a first portion of a singular task in the document 122 is contiguously highlighted, and a second portion of the singular task in the document 122 is contiguously highlighted. In this example, the virtual object generation module 202 decomposes the text of the singular task into separate text segments 302. In this way, the document 122 is editable to instruct the virtual object generation module 202 to include multiple enumerated tasks in a single virtual object 124 and/or to generate multiple virtual objects 124 for distinct portions of a single enumerated task.

In accordance with the described techniques, the virtual object generation module 202 identifies the text segments 302 as primary tasks and/or sub-tasks. Consider an example in which the document 122 is a hierarchical list having a tree structure, such as a list in which numbers (1, 2, 3, . . . ) define topics and capital letters (e.g., A, B, C . . . ) define sub-topics of respective topics. In this example, the virtual object generation module 202 identifies the primary task and the sub-tasks based on the primary task and the sub-tasks having different text-based indicators. For instance, the virtual object generation module 202 identifies, as a text segment 302 of a primary task, the text following a text-based indicator of a first type, e.g., a number. In addition, the virtual object generation module 202 identifies, as text segments 302 of sub-tasks of the primary task, the text following text-based indicators of a second type, e.g., text following capital letters that are situated between successive text-based indicators of the first type.

The virtual object generation module 202 additionally or alternatively identifies dependencies between text segments 302 in various implementations. By way of example, a first type of marking (e.g., highlighted text) serves to identify text segments 302 for integration into respective virtual objects 124, as discussed above. In addition, a second type of marking (e.g., underlined text) serves to identify successive text segments 302 as distinct tasks that are dependent on one another. In this example, the virtual object generation module 202 identifies the two consecutive text segments 302 having the second type of marking (e.g., underlined text) as dependent tasks. As further discussed below with reference to FIG. 7, the ownership module 216 assigns ownership of virtual objects 124 to users based on the dependencies and/or sub-task relationships.

The above-described examples are not to be construed as limiting. Rather, the virtual object generation module 202 identifies relationships between primary and sub-tasks as well as dependencies between text segments 302 in any one or more of a variety of ways without departing from the spirit or scope of the described techniques. In at least one example, the relationships and dependencies are identified by processing the text using a machine-learning model trained to identify relationships between primary and sub-tasks in the document 122 and/or dependencies between text segments 302 in the document 122.

In one or more implementations, the virtual object generation module 202 employs a machine-learning model to identify the text segments 302 in the document 122. Broadly, the machine-learning model is a computer representation that can be tuned (e.g., trained and retrained) based on inputs to approximate unknown functions. The machine-learning model is configurable to utilize algorithms to learn from, and make predictions on, known data by analyzing training data to learn and relearn to generate outputs that reflect patterns and attributes of the training data. Examples of machine-learning models include neural networks (e.g., deep learning neural networks), convolutional neural networks (CNNs), long short-term memory (LSTM) neural networks, decision trees, transformers, generative adversarial networks (GANs), and so forth.

By way of example, the machine-learning model includes a natural language understanding model. The natural language understanding model is trained using training data that includes documents having different organizational structures (e.g., text in numbered lists, text in paragraph format, text in outline format, etc.) and ground truth data including corresponding tasks extracted from the documents. During training, the natural language understanding model is employed to identify text segments from the documents. Moreover, a loss is calculated that captures the differences between the text segments identified by the natural language understanding model and the ground truth tasks of the corresponding documents in the training data. Further, the natural language understanding model is updated to reduce the loss. This process is repeated until the loss converges to a minimum, a particular number of epochs have been processed, etc. In this way, the natural language understanding model learns to identify and extract text segments 302 that correspond to tasks in the text of a given document 122.

In accordance with the described techniques, the virtual object generation module 202 generates a virtual object 124 for each respective text segment 302, and populates the virtual object 124 with text from the respective text segment 302. In the illustrated example, for instance, the virtual object generation module 202 identifies a first text segment 302 including the text "combine ingredients," a second text segment 302 including the text "form into balls," and a third text segment 302 including the text "place in oven at 425." Given this, the virtual object generation module generates a first virtual object 124 including the text "combine ingredients," a second virtual object 124 including the text "form into balls," and a third virtual object 124 including the text "place into oven at 425."

In one or more implementations, the virtual object generation module 202 employs the machine-learning model to generate virtual objects 124 that represent "what" is expressed by the corresponding text segments 302. For example, the machine-learning model includes a generative artificial intelligence (AI) model. The generative AI model is trained using training data that includes text segments representing tasks and ground truth data including virtual objects that represent corresponding tasks. The ground truth virtual objects, for example, are two-dimensional virtual objects, three-dimensional virtual objects, and/or animations of two and/or three-dimensional virtual objects, e.g., a sequence of frames that when displayed sequentially render the virtual objects in motion.

During training, the generative AI model is employed to generate a virtual object from a text segment of the training data. For example, the generative AI model includes an encoder that encodes the text segment as a latent representation, and a generator that generates the virtual object conditioned on the latent representation. Moreover, a loss is calculated that captures differences between the generated virtual object and the ground truth virtual object corresponding to the task. For example, the ground truth data includes the ground truth virtual object corresponding to the task and a latent representation of the ground truth virtual object. Given this, the loss measures the distance between the latent representation of the generated virtual object and the latent representation of the ground truth virtual object. Further, the generative AI model is updated to reduce the loss. This process is repeated until the loss converges to a minimum, a particular number of epochs have been processed, etc.

In this way, the generative AI model learns to generate virtual objects 124 for a given text segment 302 representing "what" is expressed by the text. In an example, the text segment 302 is "place in oven at 425," as depicted. Further, the generative AI model is employed by the virtual object generation module 202 to generate a virtual object 124 (e.g., a two-dimensional virtual object, a three-dimensional virtual object, and/or an animation of two-dimensional virtual objects and/or three-dimensional virtual objects) corresponding to the text segment 302. In this example, the generative AI model generates a virtual object 124 that is a graphical representation (e.g., an icon) of an oven, and the text segment 302 "place in oven at 425" is included as part of the virtual object 124.

The virtual object generation module 202 is further configured to insert the generated virtual objects 124 in the extended reality environment 114. As part of this, the virtual object generation module 202 orders the plurality of virtual objects 124 in a sequence based on an order in which the corresponding text segments 302 appear in the document 122. Further, the virtual object generation module 202 displays the virtual objects 124 within the extended reality environment 114 in a vertical stack, such that each subsequent virtual object 124 in the sequence is stacked beneath a preceding virtual object 124 in the sequence. In one or more implementations, the virtual objects 124 do not include anchors 208, status indications 214, or ownership indications 220 when initially inserted into the extended reality environment 114.

Figure 4:
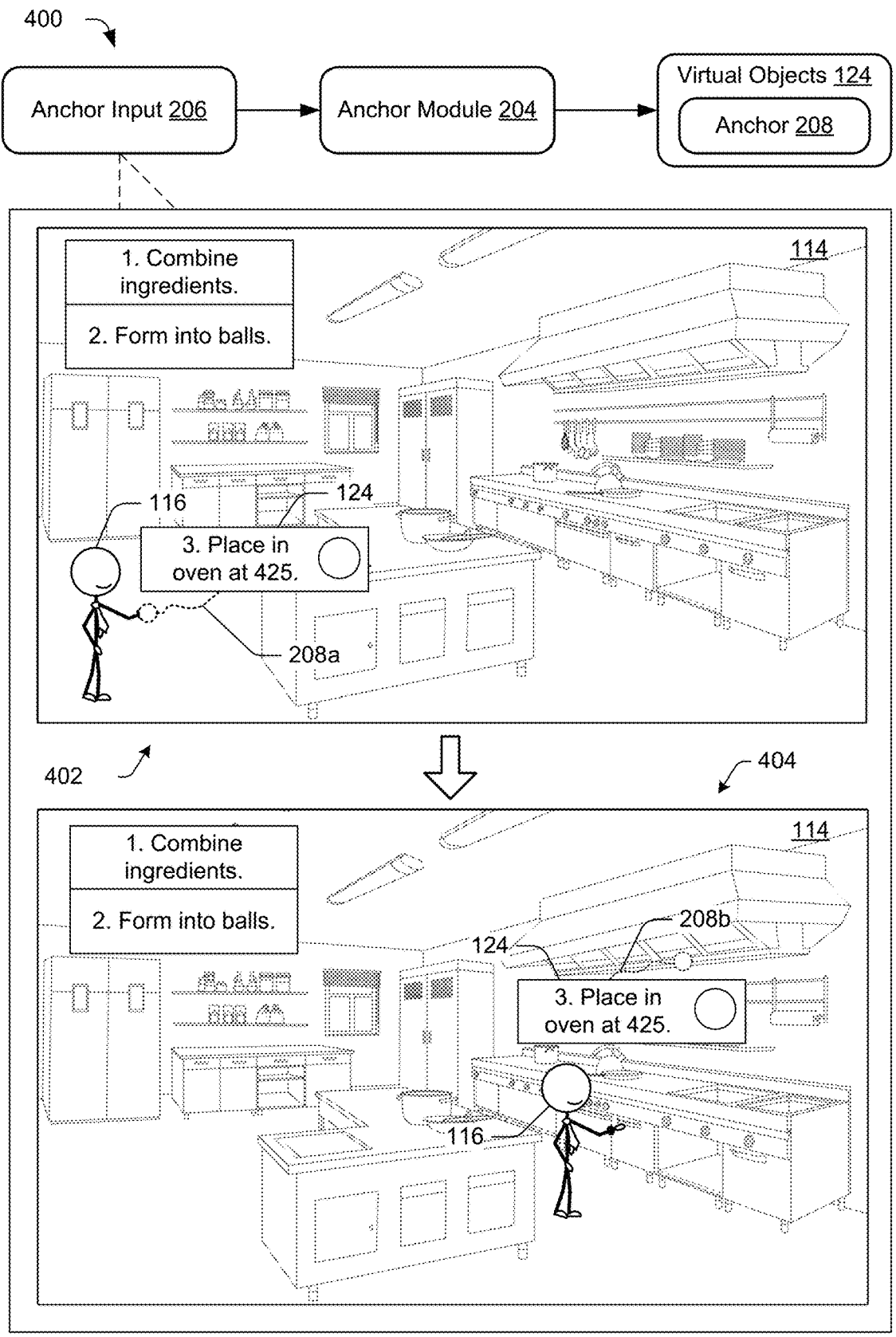
FIG. 4 depicts a system in an example implementation showing operation of an anchor module.

FIG. 4 depicts a system 400 in an example implementation showing operation of an anchor module 204. Broadly, the anchor module 204 receives an anchor input 206 with respect to a virtual object 124, and in response, the anchor module 204 assigns an anchor 208 to the virtual object 124. In particular, the system 400 depicts an example extended reality environment 114 at various stages 402, 404 of an anchor input 206. Although depicted visually in various examples for illustrative purposes, it is to be appreciated that the anchors 208 are not included visually in the extended reality environment 114, in one or more implementations.

During a first stage 402 of the anchor input 206, a grab input is received by the anchor module 204 with respect to a virtual object 124. For example, a user provides a grab input via the input devices 118 while the user representation 116 is within a threshold distance of the virtual object 124. In response, the anchor module 204 detaches the virtual object 124 from the stack, and assigns an anchor 208a to the virtual object 124. The anchor 208a affixes the virtual object 124 to the user representation 116, as shown.

Figure 5:
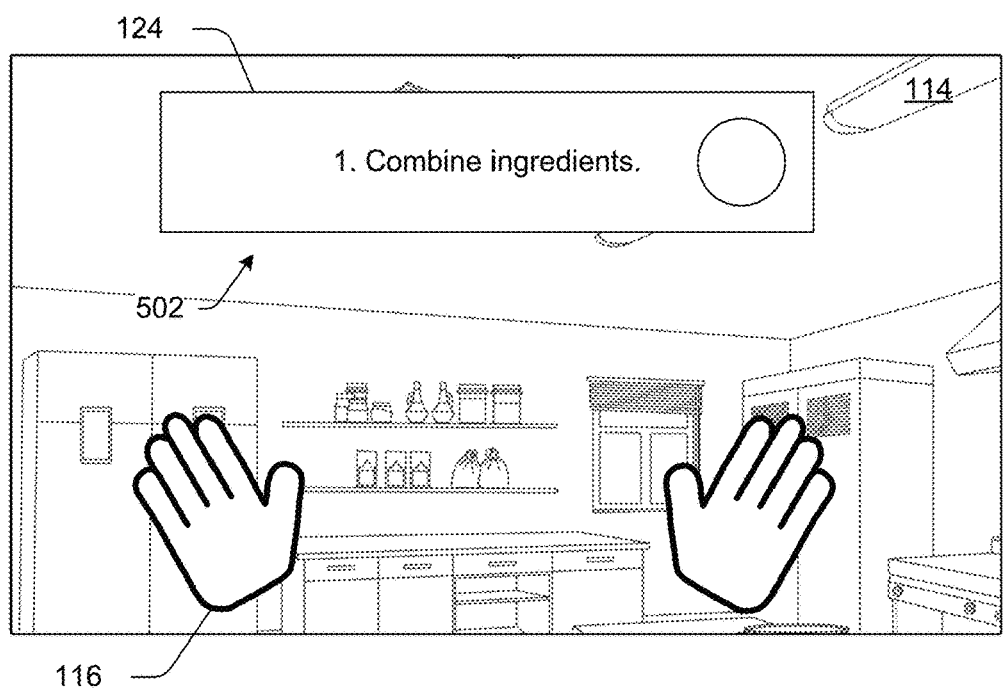
FIG. 5 is an example of a field of view of a user while a virtual object is anchored to a corresponding user representation of the user.

FIG. 5 is an example 500 of a field of view of a user while a virtual object 124 is anchored to a corresponding user representation 116 of the user. As shown, the anchor module 204 displays the virtual object 124 in a prominent position 502 within a field of view of the user while the virtual object 124 is affixed to the user representation 116. For example, the virtual object 124 is displayed as horizontally centered within the field of view of the user, and vertically centered within a top portion (e.g., a top half, top third, or top quadrant) of the field of view of the user. In this way, the text of the virtual object 124 is viewable by the user, without occluding the center of the user's field of view.

Returning to FIG. 4, during a second stage 404 of the anchor input 206, the user provides input via the input devices 118 specifying movement of the user representation 116 from a first location to a second location in the extended reality environment 114. Notably, the input is provided by the user while the virtual object 124 is anchored to the user representation 116 of the user. In response to the input, the anchor module 204 displays the virtual object 124 as following the user representation 116 from the first location to the second location in the extended reality environment 114. From the viewpoint of the user representation 116 to which the virtual object 124 is affixed, the virtual object 124 remains in the prominent position 502 within the field of view regardless of the user representation's movement. For example, the virtual object 124 remains in the prominent position within the field of view of the user regardless of how the field of view is adjusted, e.g., to view different portions of the extended reality environment 114. From the viewpoint of a different user observing the user representation 116 to which the virtual object 124 is attached, the virtual object 124 remains within a particular distance of the user representation 116 as the user representation 116 moves throughout the extended reality environment 114.

Also during the second stage 404 of the anchor input 206, the anchor module receives a place input with respect to the second location (or an object at the second location) in the extended reality environment 114. For example, the user provides a place input via the input devices 118 while the user representation 116 is within a threshold distance of the second location in the extended reality environment 114. In response, the anchor module 204 breaks the anchor 208a affixing the virtual object 124 to the user representation 116.

In addition, the anchor module 204 assigns a new anchor 208b to the virtual object 124 fastening the virtual object 124 to the new location (or the object at the new location) in the extended reality environment 114. While anchored to the object or location in the extended reality environment 114, the virtual object 124 remains located and fastened to the object or location regardless of the user representation's movement. Accordingly, the described techniques enable the virtual object 124 to dynamically change from being affixed to the user representation 116 to being affixed to the extended reality environment 114.

Additionally or alternatively, the anchor module 204 affixes the virtual objects 124 to predefined locations in the extended reality environment 114 based on text in the document 122, i.e., without receiving the anchor input 206 in the extended reality environment 114. Consider an example in which the extended reality environment 114 is a kitchen, and the extended reality environment 114 includes predefined locations associated with text-based markers, e.g., "sink, "oven," and "refrigerator." In this example, the text segments 302 in the document 122 include text-based markers. For instance, the text segment 302 "place in oven at 425" is followed by the text-based marker "<oven>" to indicate that the text segment 302 is to be performed at the predefined location associated with the oven. Given this, when the virtual objects 124 are initially inserted into the extended reality environment 114, the anchor module 204 assigns anchors 208 affixing respective virtual objects 124 to the predefined locations identified by respective text-based markers. Continuing with the previous example, the virtual object 124 including the text segment "place in oven at 425" is initially inserted into the extended reality environment 114 at the predefined location associated with the "oven" text-based marker, e.g., and detached from one or more other virtual objects 124 associated with different text-based markers.

In one or more implementations, the anchor module 204 employs the machine-learning model to identify anchors 208 in the extended reality environment 114 corresponding to the text of the virtual objects 124. For example, the content processing system 104 includes a plurality of different training environments (e.g., a kitchen environment, a chemistry lab environment, an aircraft cockpit environment, and so on). Further, each of the different training environments include a plurality of stations. Given a kitchen environment, as depicted, the stations include an oven, a stove, a counter, a fridge, etc. Broadly, the machine-learning model includes one or more classifier models, which are configured to classify the virtual objects 124 (e.g., based on the text segments 302) as belonging to one of the stations in the extended reality environment 114.

The one or more classifier models are trained using training data that includes text segments and ground truth data including the stations in the various training environments to which the text segments are assigned. During training, a classifier model is employed to classify a text segment as belonging to a station of a respective training environment. Further, a loss is calculated that captures whether the classifier model classified the text segment as belonging to a same station identified by the ground truth data for the respective training environment. The classifier model is further updated to reduce the loss. This process is repeated until the loss converges to a minimum, a particular number of epochs have been processed, etc. In one or more implementations, a classifier model is trained for each of the training environments.

In this way, the one or more classifier models learn to classify the virtual objects 124 (e.g., based on the text segments 302) as belonging to one of the stations. Given this, the anchor module 204 is leveraged to assign anchors 208 to the virtual objects 124, affixing the virtual objects 124 to the corresponding stations. For instance, the document integration system 120 identifies the extended reality environment 114 as corresponding to one of the training environments, e.g., based on user input and/or or object recognition analysis performed on the extended reality environment 114. As such, the anchor module 204 employs the classifier model corresponding to the training environment, e.g., the kitchen training environment in the illustrated example. Moreover, the document integration system 120 identifies stations in the extended reality environment 114, e.g., based on user input labeling the extended reality environment 114 and/or object recognition analysis performed on the extended reality environment 114. Given the virtual object 124 including the text segment 302 "place in oven at 425," for example, the classifier model classifies the virtual object 124 as belonging to the oven station. Further, the anchor module 204 assigns an anchor to the virtual object 124 affixing the virtual object 124 to the oven station in the extended reality environment 114.

In one or more implementations, the document integration system 120 is configured to group nearby virtual objects 124 in the extended reality environment, and display the group of nearby virtual objects 124 in a vertical stack. Once the virtual objects 124 have been placed (e.g., anchored) at respective locations throughout the extended reality environment 114, for instance, the document integration system 120 identifies a group of two or more virtual objects 124 that are within a predefined distance of one another. Further, the document integration system 120 identifies an average location for the virtual objects 124 in the group based on the coordinates of the respective virtual objects 124 in the group. Moreover, the document integration system 120 displays the virtual objects 124 in a vertical stack at the average location.

Figure 6:
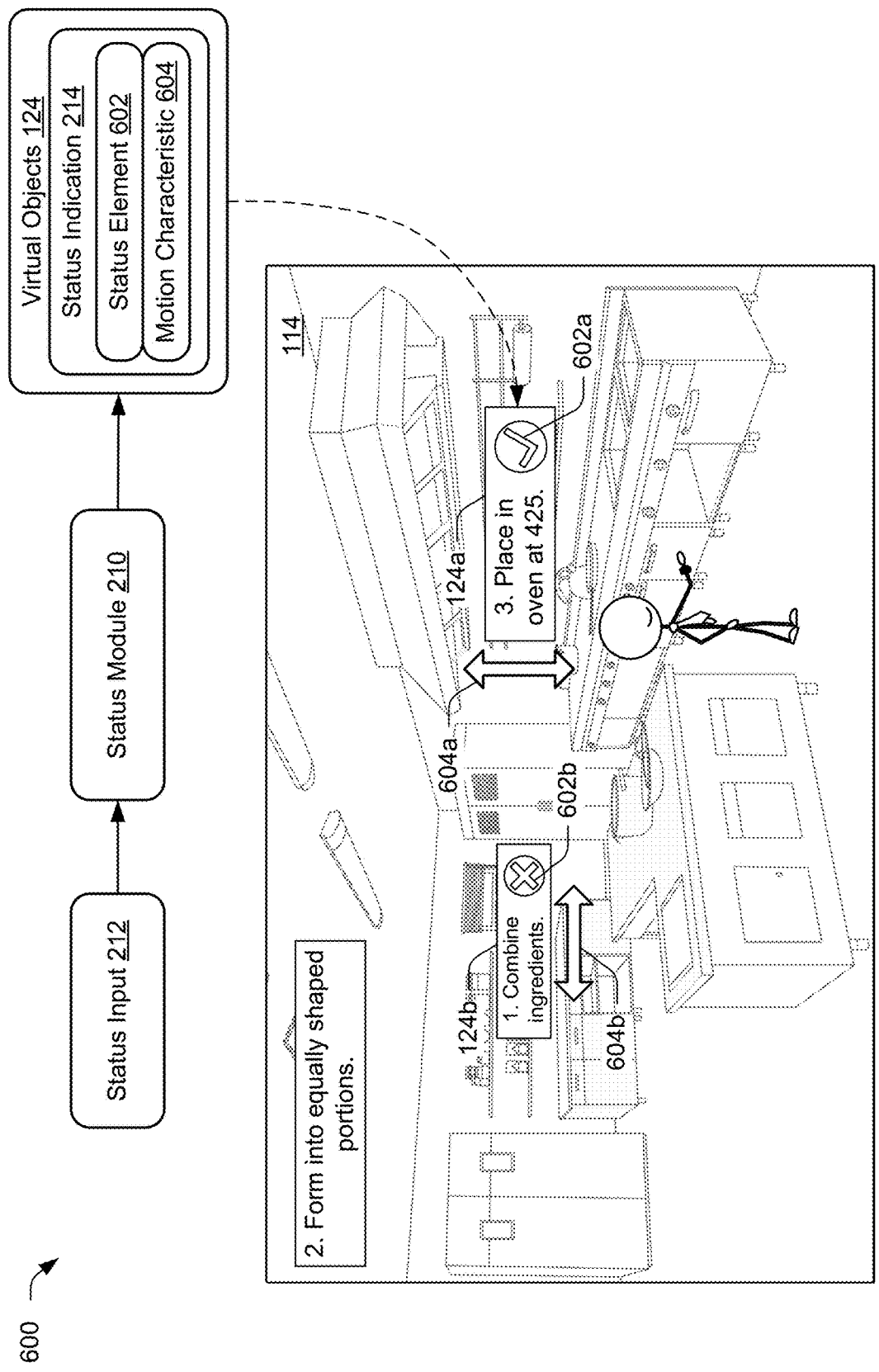
FIG. 6 depicts a system in an example implementation showing operation of a status module.

FIG. 6 depicts a system 600 in an example implementation showing operation of a status module 210. Broadly, the status module 210 is configured to receive a status input 212 assigning a status to a virtual object 124, and in response, display the virtual object 124 having a status indication 214 corresponding to the assigned status. In accordance with the described techniques, the status indication 214 includes a status element 602 which is a visual designation (e.g., icon, graphic, color, etc.) indicating the assigned status. Additionally, the status indication 214 includes a motion characteristic 604, which is a motion of the virtual object 124 indicating the assigned status. Examples of the statuses assignable to a respective virtual object 124 include, but are not limited to, "task not yet attempted," "task successfully completed," and "task unsuccessfully attempted."

In particular, the system 600 depicts an example extended reality environment 114 that includes a first virtual object 124a and a second virtual object 124b. In accordance with the described techniques, the status module 210 receives a status input 212 assigning a status to the first virtual object 124a. By way of example, the user provides an input selecting the first virtual object 124a while the user representation 116 is within a threshold distance of the first virtual object 124a. In response, the status module 210 displays a list of statuses, including "task not yet attempted," "task successfully completed," and "task unsuccessfully attempted." Furthermore, the user provides an additional input selecting one of the statuses from the list. In the illustrated example, for instance, the additional input selects the status "task successfully completed" for the first virtual object 124a.

In response to the status input 212, the status module 210 displays the virtual object 124a having a status indication 214 corresponding to the assigned status. As part of displaying the status indication 214, the status module 210 displays the first virtual object 124a having a status element 602a corresponding to the assigned status. In the illustrated example, the status element 602a corresponding to the status "task successfully completed" is a check mark icon. In addition, the status module 210 displays the first virtual object 124a having a motion characteristic 604a corresponding to the assigned status. In the illustrated example, the motion characteristic 604a corresponding to the status "task successfully completed" includes displaying the first virtual object 124a moving up and down repeatedly, e.g., bouncing.

In one or more implementations, the status module 210 is configured to remove a virtual object 124 from the extended reality environment 114 in response to the virtual object 124 being assigned a status of "task successfully completed." For example, the status module 210 displays the first virtual object 124 having the status element 602a and the motion characteristic 604a for a predetermined amount of time. After the predetermined amount of time, the virtual object 124a floats gradually upward until the virtual object 124a is removed entirely from the extended reality environment 114. By doing so, the status module 210 reduces view occlusion in the extended reality environment 114.

Moreover, the anchor module 204 is employed to automatically affix a subsequent virtual object 124 in the sequence to a user representation 116 having completed a task of a virtual object 124. By way of example, the anchor module 204 receives an indication of the status input 212 provided by the user assigning a status of "task successfully completed" to the first virtual object 124a, e.g., a third virtual object in the sequence. In response, the anchor module 204 automatically affixes the next virtual object 124 in the sequence (e.g., a fourth virtual object 124 in the sequence) to the user representation 116 of the user. In one or more implementations, the anchor module 204 automatically affixes the next unclaimed virtual object 124 in the sequence to the user representation 116 of the user. For example, if the fourth virtual object 124 in the sequence has already been claimed as owned by a different user, then the anchor module 204 automatically affixes the fifth virtual object 124 in the sequence to the user representation 116. This enables the user to begin manipulating the next virtual object 124 without navigating the user representation 116 to the initially-inserted stack of virtual objects 124, e.g., to grab the next virtual object 124.

In accordance with the described techniques, virtual objects 124 assigned different statuses include different status elements 602 and different motion characteristics 604. In the illustrated example, the second virtual object 124b is assigned the status of "task unsuccessfully attempted." Thus, the second virtual object 124b includes a status element 602b that is visually different from the status element 602a of the first virtual object 124a. Indeed, the status element 602b is an "X" icon rather than a check mark icon, as shown. Further, the second virtual object 124b includes a motion characteristic 604b that is different than the motion characteristic 604a of the first virtual object 124a. Indeed, the motion characteristic 604b dictates that the virtual object 124b repeatedly move side to side rather than up and down, as shown.

In one or more implementations, a virtual object 124 is automatically assigned a status of "task not yet attempted" in response to a grab input that detaches the virtual object from the initially-inserted stack of virtual objects, and affixes the virtual object 124 to the user representation 116. For example, the virtual object 124 does not include a status element 602 when the virtual object 124 is attached to the initially-inserted stack of virtual objects 124. However, in response to the grab input, the virtual object 124 is updated to include a status element 602 corresponding to the status of "task not yet attempted." For example, the status element 602 is a circle that is filled with a uniform color, rather than the check mark icon, or the "X" icon. In response to a place input fastening the virtual object 124 to an object or location in the extended reality environment 114, the status module 210 displays the virtual object 124 having a motion characteristic 604 corresponding to the status of "task not yet attempted." For example, the motion characteristic 604 dictates that the virtual object 124 remains stationary, rather than move up and down, or side to side.

It is to be appreciated that the status indications 214 corresponding to the various statuses differ, in variations. By way of example, the status elements 602 associated with the various statuses are any suitable graphic, icon, color, and the like, so long as the status elements 602 are different for different statuses. Further, the motion characteristics 604 associated with the various statuses are any suitable motion characteristic, so long as the motion characteristics are different for different statuses. Moreover, the status indications 214 associated with the statuses include additional or alternative visual designations. As an example, the status indications 214 include a color designation in which the virtual objects 124 are filled with a distinct color based on which statuses are assigned to the virtual objects 124. Furthermore, although a particular set of statuses are described herein, it is to be appreciated that additional or alternative statuses are assignable to the virtual objects 124, in variations.

Figure 7:
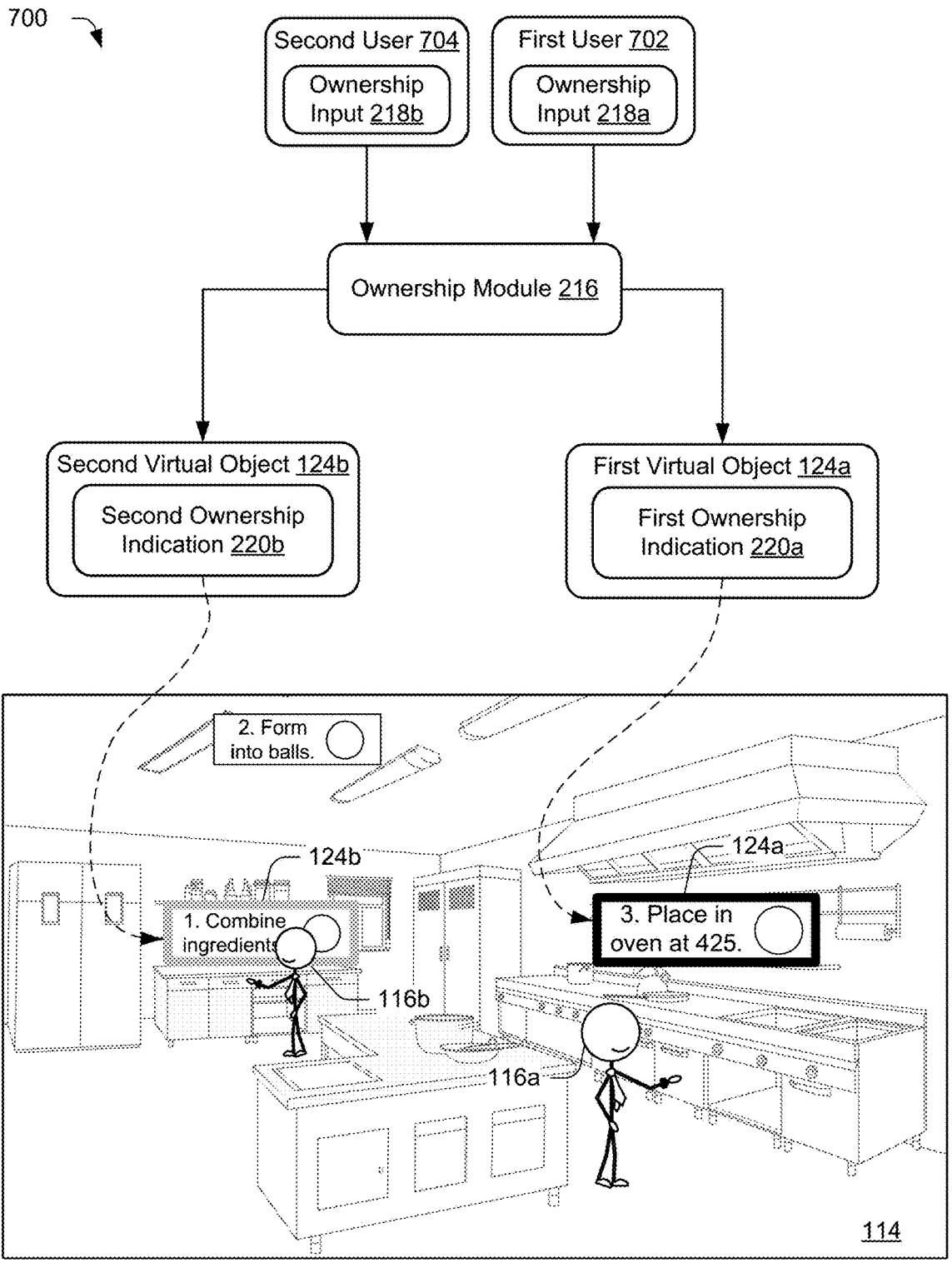
FIG. 7 depicts a system in an example implementation showing operation of an ownership module.

FIG. 7 depicts a system 700 in an example implementation showing operation of an ownership module 216. Broadly, the ownership module 216 receives an ownership input 218 claiming ownership of a particular virtual object 124 by a user, and in response, the ownership module 216 displays the particular virtual object having an ownership indication 220 corresponding to the user. In various examples, a user claims a respective virtual object 124 to indicate the user's intent to perform the task associated with the respective virtual object 124. As shown, the system 700 depicts an example extended reality environment 114 that includes a first user representation 116a controlled by a first user 702, and a second user representation 116b controlled by a second user 704. The example extended reality environment 114 further includes a first virtual object 124a and a second virtual object 124b.

In accordance with the described techniques, the ownership module 216 receives a first ownership input 218a claiming ownership of the first virtual object 124a by a first user. For example, the first user 702 provides the first ownership input 218a while the first user representation 116a is within a threshold distance of the first virtual object 124a. Further, the ownership module 216 receives a second ownership input 218b claiming ownership of the second virtual object 124b by the second user 704. For example, the second user 704 provides the second ownership input 218b while the second user representation 116b is within a threshold distance of the second virtual object 124b. In one or more implementations, a grab input doubles as an anchor input 206 and an ownership input 218. That is, a grab input which anchors a virtual object 124 to a user representation 116 is additionally effective to claim ownership of the virtual object 124 by a user that provides the grab input. Additionally or alternatively, the anchor input 206 and the ownership input 218 are separate and distinct inputs.

In one or more implementations, the ownership module 216 is configured to assign ownership of groups of related virtual objects 124 to one user of multiple users of the document integration system 120. As previously discussed, the virtual object generation module 202 generates groups of virtual objects 124 including sub-tasks of respective primary tasks and/or groups of dependent tasks. Given this, if a user provides an ownership input 218 with respect to a virtual object 124 in a group, the ownership module 216 assigns ownership of each virtual object 124 in the group to the user. Thus, to maintain continuity for performing groups of related tasks, the ownership module 216 facilitates ownership of the groups of related tasks (e.g., sub-tasks of a primary task and/or dependent tasks) by a single user of the document integration system 120, e.g., rather than assigning related tasks to different users.

In response to the first ownership input 218a, the ownership module 216 displays the first virtual object 124a having a first ownership indication 220a corresponding to the first user 702. In the illustrated example, the first ownership indication 220a is a border surrounding the first virtual object 124a and having a first distinctive color (e.g., black) corresponding to the first user 702. In response to the second ownership input 218b, the ownership module 216 displays the second virtual object 124b having a second ownership indication 220b corresponding to the second user 704. As shown, for instance, the second ownership indication 220b is a border surrounding the second virtual object 124b and having a second distinctive color (e.g., gray) corresponding to the second user 704. Therefore, the ownership module 216 is configured to visually distinguish virtual objects 124 that are owned by different users by adding different ownership indications 220 to the virtual objects 124.

In one or more implementations, an ownership input 218 is effective to transfer ownership of a virtual object 124 from one user to another user. Consider the illustrated example in which the first virtual object 124a is owned by the first user 702 and includes the first ownership indication 220a. In this example, the status module 210 receives a status input from the first user 702 assigning the status of "task unsuccessfully attempted" to the first virtual object 124a. For instance, the ownership module 216 receives an additional ownership input 218, provided by the second user 704, claiming ownership of the first virtual object 124a. In response to the additional ownership input 218 and based on the first virtual object 124a being assigned the status of "task unsuccessfully attempted," the status module 210 transfers ownership of the first virtual object 124a from the first user 702 to the second user 704. Further, the status module 210 modifies the first virtual object 124a from having the first ownership indication 220a to having the second ownership indication 220b. Therefore, ownership of a virtual object 124 becomes transferrable based on the virtual object 124 being assigned the status of "task unsuccessfully attempted."

In various implementations, each user representation 116 in a multi-user extended reality environment 114 includes a different visual designation in order to differentiate between the different user representations 116, e.g., each user representation 116 in the extended reality environment is a different color. In accordance with these implementations, the ownership indication 220 associated with a respective user correlates to a visual designation of the respective user's user representation 116. Consider an example in which the first user representation 116a is blue and the second user representation 116b is orange. In this example, the first ownership indication 220a is a blue border surrounding the first virtual object 124a, and the second ownership indication 220b is an orange border surrounding the second virtual object 124b.

In one or more scenarios, multiple virtual objects 124 are claimed as being owned by a single user at a given point in time. By way of example, the first user 702 provides a series of grab inputs with respect to multiple virtual objects 124 in the initially-inserted stack of virtual objects. The grab inputs are effective to claim ownership of the multiple virtual objects 124 by the first user 702, and display the multiple virtual objects 124 having the first ownership indication 220a.

In these scenarios, the anchor module 204 designates a particular virtual object 124 as being in-progress. In at least one example, the in-progress virtual object 124 is one of the virtual objects 124 that is claimed as owned by the first user 702 and is earliest in the sequence of virtual objects 124. Accordingly, the anchor module 204 assigns an anchor 208 affixing the in-progress virtual object 124 to the first user representation 116a, e.g., the anchor module 204 displays the in-progress virtual object 124 at the prominent position 502 in the field of view of the first user 702. Meanwhile, the additional virtual objects 124 that are owned by the first user 702 include the first ownership indication 220a, but remain in the initially-inserted stack. In this way, the stack is observable by the second user 704 to determine which virtual objects 124 are owned by the first user 702, but are not yet in the process of being completed. Moreover, solely the in-progress virtual object 124 is detached from the stack, enabling the second user 704 to determine which task the first user 702 is actively in the process of completing.

In one or more implementations, the status module 210 is configured to receive a status input 212 from the first user 702 assigning a status of "task successfully completed" to the in-progress virtual object 124. In response, the status module 210 displays the particular virtual object 124 having the status indication 214 corresponding to the status, and subsequently removes the particular virtual object 124 from the extended reality environment 114, as previously discussed. Also in response to the status input 212, the anchor module 204 automatically designates the next virtual object 124 in the sequence that is owned by the first user as being in-progress. As part of this, the anchor module 204 assigns an anchor 208 affixing the newly designated virtual object 124 to the first user representation 116a. For example, the anchor module 204 detaches the newly designated virtual object 124 from the stack, and displays the newly designated virtual object 124 at the prominent position 502 in the field of view of the first user 702.

Figure 8:
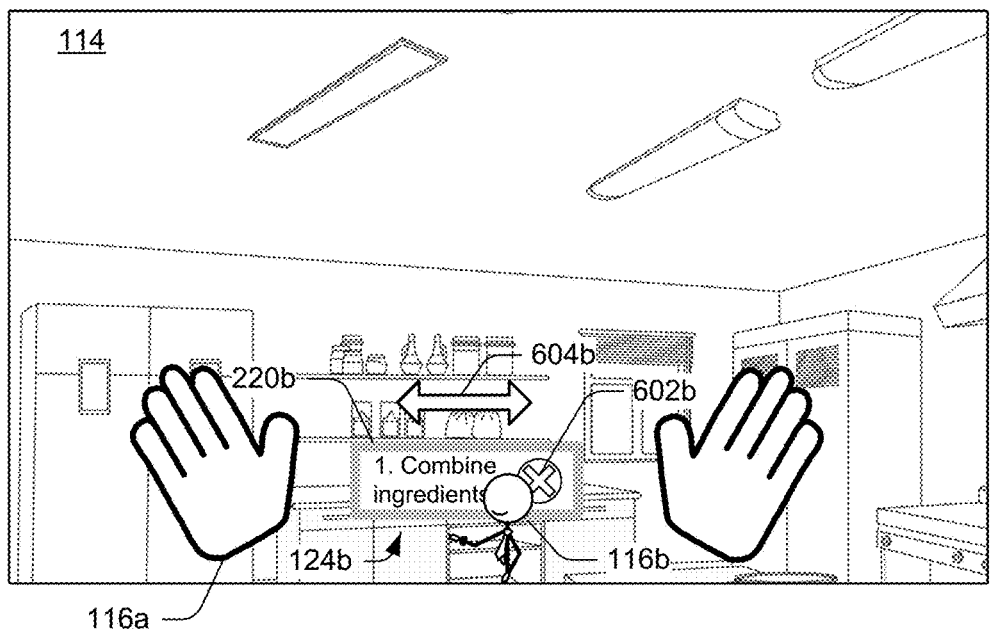
FIG. 8 is an example of a field of view of a user in a multi-user extended reality environment.

FIG. 8 is an example 800 of a field of view of a user in a multi-user extended reality environment. In particular, the example 800 depicts a field of view 802 from the viewpoint of the first user 702 of FIG. 7. As shown, the field of view 802 includes the second user representation 116b and the second virtual object 124b. Further, the second virtual object 124b includes the status element 602b, the motion characteristic 604b, and the ownership indication 220b.

Based on the text of the second virtual object 124b and the ownership indication 220b, the first user 702 is able to determine what task the second user 704 is in the process of performing. Further, based on the status element 602b and the motion characteristic 604b, the first user 702 is able to determine that the task of the second virtual object 124b has been unsuccessfully attempted. The field of view 802, therefore, illustrates that a user in a multi-user extended reality environment 114 is able to scan the extended reality environment 114 to determine which tasks are currently being performed by which users, as well as statuses of the tasks.

Example Procedure

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-8.

FIG. 9 is a flow diagram depicting a procedure 900 in an example implementation for integrating text of a document into an extended reality environment. In the procedure 900, a document that includes text is received (block 902). For example, the virtual object generation module 202 receives a document 122 that includes text.

A plurality of virtual objects are generated based on the document, the plurality of virtual objects including, respectively, a different portion of the text (block 904). For instance, the virtual object generation module 202 partitions the document 122 into a plurality of text segments 302. Furthermore, the virtual object generation module 202 generates a virtual object 124 for each respective text segment, and populates the virtual object 124 with text from the respective text segment.

The plurality of virtual objects are inserted into an extended reality environment (block 906). For example, the virtual object generation module 202 inserts the virtual objects 124 into the extended reality environment 114.

An anchor input is received affixing a particular said virtual object to an object or location in the extended reality environment (block 908). By way of example, the anchor module 204 receives an anchor input 206 with respect to a virtual object 124, and in response, the anchor module 204 assigns an anchor 208 to the virtual object 124. Broadly, the anchor 208 affixes the virtual object 124 to a user representation 116, or an object or location in the extended reality environment 114.

An ownership input is received claiming ownership of the particular said virtual object by a user (block 910). By way of example, the ownership module 216 receives an ownership input 218 by a user with respect to a virtual object 124, and in response, the ownership module 216 assigns ownership of the virtual object 124 to the user.

A status input is received assigning a status to a task associated with the particular said virtual object (block 912). For instance, the status module 210 receives a status input 212 assigning a status to a task associated with the virtual object 124. The statuses, for example, include "task not yet attempted," "task successfully completed," and "task unsuccessfully attempted."

The particular said virtual object is displayed as affixed to the object or location in the extended reality environment, as having an ownership indication corresponding to the user, and as having a status indication corresponding to the status (block 914). By way of example, the virtual object 124 is displayed as affixed to the object or location in the extended reality environment 114, as indicated by the anchor input 206. While affixed to the user representation 116, the anchor module 204 displays the virtual object as following the user representation 116 throughout the extended reality environment 114. While affixed to an object or location in the extended reality environment, the anchor module 204 displays the virtual object 124 as remaining located and fastened to the object or location, regardless of the movement of the user representation 116.

Moreover, the virtual object 124 is displayed as having an ownership indication 220 corresponding to the user that owns the virtual object 124, as indicated by the ownership input 218. For example, the extended reality environment 114 includes multiple user representations 116 controlled by respective users of the document integration system 120. Further, the respective virtual objects 124 are displayable as including ownership indications 220 that differ visually depending on which users claim the respective virtual objects 124. Given this, the ownership module 216 displays the virtual object 124 that is claimed as owned by the user as differentiated from a different virtual object 124 that is claimed as owned by a different user.

Furthermore, the virtual object 124 is displayed as having a status indication 214 corresponding to the status assigned to the virtual object 124, as indicated by the status input 212. For example, the respective virtual objects 124 are displayable as including status elements 602 and motion characteristics 604 that differ visually depending on which status is assigned to the respective virtual objects 124. Given this, the status module 210 displays the virtual object 124 as differentiated from a different virtual object 124 that is assigned a different status.

Example System and Device

Figure 10:
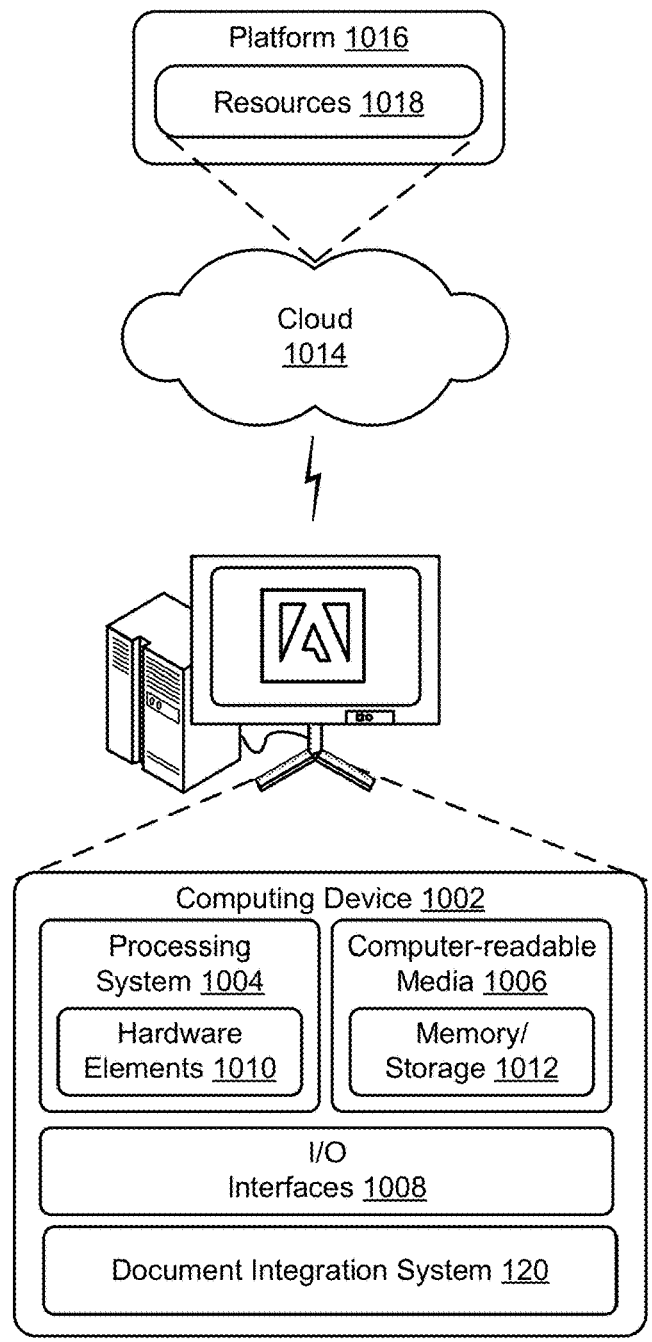
FIG. 10 illustrates an example system including various components of an example device that can be implemented as any type of computing device as described and/or utilize with reference to FIGS. 1-9 to implement embodiments of the techniques described herein.

FIG. 10 illustrates an example system generally at 1000 that includes an example computing device 1002 that is representative of one or more computing systems and/or devices that implement the various techniques described herein. This is illustrated through inclusion of the document integration system 120. The computing device 1002 is configurable, for example, as a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that is configurable as processors, functional blocks, and so forth. This includes implementation in hardware as an application specific integrated circuit or other logic device formed using one or more semiconductors. The hardware elements 1010 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1006 is illustrated as including memory/storage 1012. The memory/storage 1012 represents memory/storage capacity associated with one or more computer-readable media. The memory/storage 1012 includes volatile media (such as random access memory (RAM)) and/or nonvolatile media (such as read only memory (ROM), Flash memory, optical disks, magnetic disks, and so forth). The memory/storage 1012 includes fixed media (e.g., RAM, ROM, a fixed hard drive, and so on) as well as removable media (e.g., Flash memory, a removable hard drive, an optical disc, and so forth). The computer-readable media 1006 is configurable in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), depth sensors, light detection and ranging (LIDAR) sensors, motion sensors, virtual reality headset controllers, and so forth. Examples of output devices include a display device (e.g., a monitor or projector), speakers, a printer, a network card, tactile-response device, a virtual reality headset, augmented reality glasses, and so forth. Thus, the computing device 1002 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1002. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1002, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1010. The computing device 1002 is configured to implement particular instructions and/or functions corresponding to the software and/or hardware modules. Accordingly, implementation of a module that is executable by the computing device 1002 as software is achieved at least partially in hardware, e.g., through use of computer-readable storage media and/or hardware elements 1010 of the processing system 1004. The instructions and/or functions are executable/operable by one or more articles of manufacture (for example, one or more computing devices 1002 and/or processing systems 1004) to implement techniques, modules, and examples described herein.

The techniques described herein are supported by various configurations of the computing device 1002 and are not limited to the specific examples of the techniques described herein. This functionality is also implementable all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 abstracts resources and functions to connect the computing device 1002 with other computing devices. The platform 1016 also serves to abstract scaling of resources to provide a corresponding level of scale to encountered demand for the resources 1018 that are implemented via the platform 1016. Accordingly, in an interconnected device embodiment, implementation of functionality described herein is distributable throughout the system 1000. For example, the functionality is implementable in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method, comprising:
   receiving, by a processing device, a document that includes text;
   partitioning, by the processing device, the document into a plurality of text segments;
   generating, by the processing device, a plurality of virtual objects from the plurality of text segments, respectively;
   inserting, by the processing device, the plurality of virtual objects into an extended reality environment;
   receiving, by the processing device, a user input affixing a particular said virtual object to a user representation in the extended reality environment, specifying movement of the user representation from a first location to a second location in the extended reality environment, and affixing the particular said virtual object to the second location; and
   displaying, by the processing device, the particular said virtual object as initially following the user representation from the first location to the second location in the extended reality environment, and subsequently as located and fastened to the second location in the extended reality environment.

2. The method of claim 1, wherein the partitioning includes automatically partitioning the document into the plurality of text segments based on one or more text-based heuristics indicating that the plurality of text segments correspond to different components of a list in the text of the document.

3. The method of claim 1, wherein the document includes a contiguous portion of the text having a particular marking, and wherein the partitioning includes identifying, as one of the plurality of text segments, the contiguous portion of the text.

4. The method of claim 1, further comprising receiving, by the processing device, an additional user input specifying a status of multiple statuses for a task associated with the particular said virtual object.

5. The method of claim 4, further comprising displaying, by the processing device and in response to receiving the additional user input, a status element within the particular said virtual object that indicates the status, the status element being different from an additional status element of an additional virtual object in the extended reality environment that is assigned a different status.

6. The method of claim 4, further comprising displaying, by the processing device and in response to receiving the additional user input, the particular said virtual object in accordance with a motion characteristic corresponding to the status, the motion characteristic being different based on which one of the multiple statuses is specified.

7. The method of claim 1, wherein the extended reality environment is a virtual reality environment, and the user representation is a user avatar that mimics an appearance of a user.

8. The method of claim 1, wherein the extended reality environment is an augmented reality environment, and the user representation is a user.

9. The method of claim 1, further comprising:
   receiving, by the processing device, an additional user input marking a task associated with the particular said virtual object as successfully completed; and
   removing, by the processing device and in response to receiving the additional user input, the particular said virtual object from the extended reality environment.

10. The method of claim 9, wherein the generating the plurality of virtual objects includes ordering the plurality of virtual objects in a sequence, the method further comprising automatically affixing, by the processing device and in response to receiving the additional user input, a subsequent virtual object in the sequence to the user representation in the extended reality environment.

11. The method of claim 1, wherein the user input further claims ownership of the particular said virtual object by a user, the method further comprising adding, by the processing device and in response to receiving the user input, a first visual indication to the particular said virtual object corresponding to the user.

12. The method of claim 11, further comprising:
   receiving, by the processing device, an additional user input from an additional user claiming ownership of an additional virtual object; and
   adding, by the processing device and in response to receiving the additional user input, a second visual indication to the additional virtual object, the second visual indication corresponding to the additional user and being different than the first visual indication.

13. A system, comprising:
   a processing device; and
   a computer-readable storage media storing instructions that, responsive to execution by the processing device, cause the processing device to perform operations including:
   receiving a document that includes text;
   generating a virtual object based on the document that includes a portion of the text;
   inserting the virtual object into an extended reality environment;
   receiving, while a user representation in the extended reality environment is within a threshold distance of the virtual object, a user input specifying a status of multiple statuses for a task associated with the virtual object; and
   displaying, in response to receiving the user input, the virtual object having a visual designation based on the status, the visual designation being different from an additional visual designation of an additional virtual object in the extended reality environment that is assigned a different status.

14. The system of claim 13, wherein the displaying includes displaying the virtual object in accordance with a motion characteristic that indicates the status, the motion characteristic being different based on which one of the multiple statuses is specified.

15. The system of claim 13, wherein the status indicates that the task has been successfully completed, the operations further including removing, in response to displaying the virtual object having the visual designation, the virtual object from the extended reality environment.

16. A non-transitory computer-readable medium storing executable instructions, which when executed by a processing device, cause the processing device to perform operations comprising:
   receiving a document that includes text;
   generating a plurality of virtual objects based on the document, the plurality of virtual objects including, respectively, a different portion of the text;
   inserting the plurality of virtual objects into an extended reality environment;
   receiving a user input from a first user claiming ownership of a first virtual object; and
   in response to receiving the user input, displaying the first virtual object as anchored to a user representation of the first user in the extended reality environment and having a first visual ownership indication based on the ownership of the first virtual object by the first user, the first visual ownership indication being different from a second visual ownership indication of a second virtual object in the extended reality environment that is claimed as owned by a second user.

17. The non-transitory computer-readable medium of claim 16, the operations further comprising:
   receiving an additional user input from the second user claiming ownership of the first virtual object; and
   modifying, in response to receiving the additional user input, the first virtual object from having the first visual ownership indication to having the second visual ownership indication.

18. The non-transitory computer-readable medium of claim 16, the operations further comprising receiving an additional user input from the first user specifying movement of the user representation to a location in the extended reality environment and transitioning the first virtual object from being anchored to the user representation to being anchored to the location in the extended reality environment.

19. The non-transitory computer-readable medium of claim 18, the operations further comprising displaying the first virtual object as initially following the user representation to the location in the extended reality environment, and subsequently as anchored to the location in the extended reality environment.

20. The non-transitory computer-readable medium of claim 16, wherein generating the plurality of virtual objects includes partitioning the document into different portions of the text by identifying a plurality of text-based indicators of components of a list, and identifying, as the different portions of the text, segments of the text separated by successive text-based indicators of the plurality of text-based indicators.

* * * * *